(12) United States Patent
Goertz et al.

(10) Patent No.: US 11,618,591 B2
(45) Date of Patent: Apr. 4, 2023

(54) COMPOSITE LAMINATE DAMAGE DETECTION METHOD USING AN IN-SITU THERMAL GRADIENT AND EXPANSION DIFFERENCES ACROSS THE DAMAGE

(71) Applicant: The Boeing Company, Chicago, IL (US)

(72) Inventors: Samuel R. Goertz, Issaquah, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 448 days.

(21) Appl. No.: 16/786,588

(22) Filed: Feb. 10, 2020

(65) Prior Publication Data

US 2021/0245897 A1    Aug. 12, 2021

(51) Int. Cl.
*B64C 39/02*    (2006.01)
*G01B 11/16*    (2006.01)
(Continued)

(52) U.S. Cl.
CPC .............. *B64F 5/60* (2017.01); *B64C 39/024* (2013.01); *G01B 9/02098* (2013.01);
(Continued)

(58) Field of Classification Search
CPC ... B64F 5/60; B64C 39/024; B64C 2201/123; B64C 2201/127; G01B 9/02098;
(Continued)

(56) References Cited

U.S. PATENT DOCUMENTS

2019/0331620 A1    10/2019    Troy et al.

FOREIGN PATENT DOCUMENTS

| EP | 0 492 559 A2 | 7/1992 |
| EP | 3 312 095 A1 | 4/2018 |

(Continued)

OTHER PUBLICATIONS

Absolute Geometries, Laser Line Scanning Process, 2009, 1 page, www.absolutegeometries.com/laser_line_scanning_process.html.

(Continued)

*Primary Examiner* — Brian P Sweeney
(74) *Attorney, Agent, or Firm* — McDonnell Boehnen Hulbert & Berghoff LLP

(57) ABSTRACT

An example system for in-situ inspection of a composite structure includes a surface-strain imaging apparatus and a controller. The surface-strain imaging apparatus is configured to image an area of an outer surface of the composite structure while a temperature of the composite structure warms to thermal equilibrium with a surrounding environment and a temperature gradient exists within the composite structure. The controller includes a processor and a memory, and is configured to detect, using data received from the surface-strain imaging apparatus, an out-of-plane displacement of the outer surface in the area caused by the temperature gradient. The controller is also configured to determine that the out-of-plane displacement satisfies a threshold condition and, based on determining that the out-of-plane displacement satisfies the threshold condition, flag the area of the outer surface for further inspection.

20 Claims, 11 Drawing Sheets

(51) Int. Cl.
  *G01B 11/24* (2006.01)
  *G01B 9/02* (2022.01)
  *B64F 5/60* (2017.01)
  *G01B 9/02098* (2022.01)

(52) U.S. Cl.
  CPC ........ *G01B 11/162* (2013.01); *G01B 11/2441* (2013.01); *B64C 2201/123* (2013.01); *B64C 2201/127* (2013.01)

(58) Field of Classification Search
  CPC . G01B 11/162; G01B 11/2441; G01B 11/167; G01B 11/24; G01B 11/16; G01M 11/081; G01M 99/002; G01N 21/8851; G01N 2021/8887
  See application file for complete search history.

(56) References Cited

FOREIGN PATENT DOCUMENTS

| | | | |
|---|---|---|---|
| WO | WO 2018/064104 A1 | 4/2018 | |
| WO | WO 2018064104 A1 * | 4/2018 | ............. G01N 25/72 |
| WO | WO 2019/069501 A1 | 4/2019 | |

OTHER PUBLICATIONS

Heida et al., D-Sight technique for rapid impact damage detection on composite aircraft structures, NDT.net—Jun. 1999, vol. 4 No. 6, 7 pages, https://www.ndt.net/article/ecndt98/aero/025/025.htm.
Pezzoni, R., Laser-Shearography for Nondestructive Testing of Large Area Composite Helicopter Structures, Roma 2000 15th WCNDT, Apr. 2001, 8 pages, https://www.ndt.net/articleAvcndt00/papers/idn732/idn732.htm.
Takeda et al., "Debonding monitoring of composite repair patches using embedded small-diameter FBG sensors", Smart Materials and Structures, IOP Publishing, vol. 16, No. 3, Apr. 24, 2007.
Extended European Search Report prepared by the European Patent Office in application No. EP 21 151 648.9 dated Jun. 21, 2021.

* cited by examiner

1000

IMAGING, USING A SURFACE-STRAIN IMAGING APPARATUS, AN AREA OF AN OUTER SPACE OF A COMPOSITE STRUCTURE WHILE A TEMPERATURE OF THE COMPOSITE STRUCTURE WARMS TO THERMAL EQUILIBRIUM WITH A SURROUNDING ENVIRONMENT AND A TEMPERATURE GRADIENT EXISTS BETWEEN AN INNER SURFACE OF THE COMPOSITE STRUCTURE AND THE OUTER SURFACE OF THE COMPOSITE STRUCTURE, WHEREIN THE INNER SURFACE OF THE COMPOSITE STRUCTURE AND THE OUTER SURFACE OF THE COMPOSITE STRUCTURE ARE SEPARATED BY MULTIPLE INTERNAL LAYERS — 1002

DETECTING, BY A CONTROLLER USING DATA RECEIVED FROM THE SURFACE-STRAIN IMAGING APPARATUS, AN OUT-OF-PLANE DISPLACEMENT OF THE OUTER SURFACE IN THE AREA CAUSED BY THE TEMPERATURE GRADIENT — 1004

DETERMINING, BY THE CONTROLLER, THAT THE OUT-OF-PLANE DISPLACEMENT SATISFIES A THRESHOLD CONDITION — 1006

BASED ON DETERMINING THAT THE OUT-OF-PLANE DISPLACEMENT SATISFIES THE THRESHOLD CONDITION, FLAGGING, BY THE CONTROLLER, THE AREA OF THE OUTER SURFACE FOR FURTHER INSPECION — 1008

FIG. 10

COMPOSITE LAMINATE DAMAGE DETECTION METHOD USING AN IN-SITU THERMAL GRADIENT AND EXPANSION DIFFERENCES ACROSS THE DAMAGE

FIELD

The present disclosure relates generally to non-destructive inspection, and more particularly, to systems and methods for non-destructive inspection of composite structures based on thermal expansion differences.

BACKGROUND

Modern aerospace structures are susceptible to mechanical damage. By way of example, hailstorms or lightning storms can damage an aircraft's skin (e.g., fuselage, wings, or other structures) while the aircraft is in flight or on the ground. Similarly, incidental contact with various ground objects or debris can damage an aircraft's skin. The ability to detect damage to aircraft skins is therefore useful to operators of those aircrafts.

In aircraft skins, composite materials are increasingly used as substitutes for conventional materials, such as aluminum and steel alloys. The use of composite materials is due in part to the generally high strength-to-weight ratio inherent in composite materials. Composite materials generally include a network of reinforcing fibers that are applied in layers and a resin that substantially wets the reinforcing fibers to form an intimate contact between the resin and the reinforcing fibers.

For high-energy impacts to an aircraft skin, a delamination, or separation of adjacent layers, can occur under the surface of the aircraft skin. In some examples, delaminations can be larger than any exterior visual indications of potential damage.

SUMMARY

In one example, a system for in-situ inspection of a composite structure is described. The system includes a surface-strain imaging apparatus and a controller. The surface-strain imaging apparatus includes a detector, and is configured to image an area of an outer surface of the composite structure while a temperature of the composite structure warms to thermal equilibrium with a surrounding environment and a temperature gradient exists between an inner surface of the composite structure and the outer surface of the composite structure. The inner surface of the composite structure and the outer surface of the composite structure are separated by multiple internal layers. The controller includes a processor and a memory, and is configured to detect, using data received from the surface-strain imaging apparatus, an out-of-plane displacement of the outer surface in the area caused by the temperature gradient. The controller is also configured to determine that the out-of-plane displacement satisfies a threshold condition, and to flag the area of the outer surface for further inspection based on determining that the out-of-plane displacement satisfies the threshold condition.

In another example, a system for in-situ inspection of a composite structure is described. The system includes a surface-strain imaging apparatus and a controller. The surface-strain imaging apparatus includes a detector, and is configured to image an area of an outer surface of the composite structure while a temperature of the composite structure warms to thermal equilibrium with a surrounding environment and a temperature gradient exists between an inner surface of the composite structure and the outer surface of the composite structure. The inner surface of the composite structure and the outer surface of the composite structure are separated by multiple internal layers. The controller includes a processor and a memory, and is configured to receive, from the surface-strain imaging apparatus, data indicative of a shape of the outer surface of the composite structure. In addition, the controller is configured to determine whether the data is indicative of a delamination between internal layers of the multiple internal layers of the composite structure.

In another example, a method for in-situ inspection of a composite structure is described. The method includes imaging, using a surface-strain imaging apparatus, an area of an outer surface of the composite structure while a temperature of the composite structure warms to thermal equilibrium with a surrounding environment and a temperature gradient exists between an inner surface of the composite structure and the outer surface of the composite structure. The inner surface of the composite structure and the outer surface of the composite structure are separated by multiple internal layers. The method also includes detecting, by a controller using data received from the surface-strain imaging apparatus, an out-of-plane displacement of the outer surface in the area caused by the temperature gradient. In addition, the method includes determining, by the controller, that the out-of-plane displacement satisfies a threshold condition, and flagging, by the controller area of the outer surface for further inspection based on determining that the out-of-plane displacement satisfies the threshold condition.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

FIG. 10 shows a flowchart of a method, according to an example.

DETAILED DESCRIPTION

Figure 1:
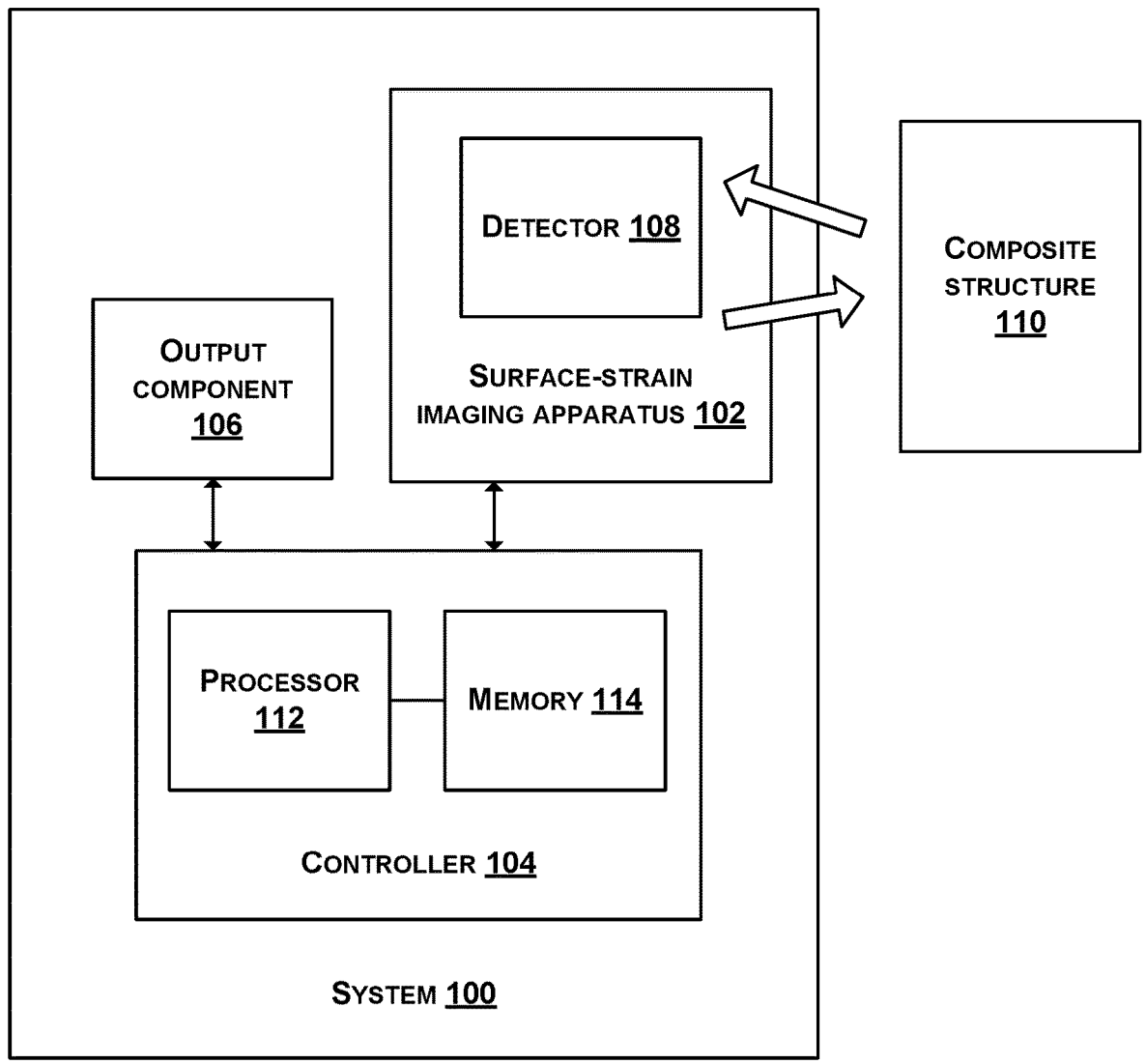
FIG. 1 illustrates a system, according to an example.

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Since composite aircraft skins are susceptible to mechanical damage during operation, there is a need for an inspection technique to assess the structural health of composite aircraft skins. Within examples, systems and methods for inspecting a composite structure, such as a composite aircraft skin are described. The systems and methods facilitate inspecting aircraft composite skins for damage in-situ, in other words, while the aircraft is in-service. Further, the systems and methods allow for identifying damage that may be hidden from visual inspection, such as delaminations.

In an example method, a surface-strain imaging apparatus is used to inspect a composite structure having a temperature gradient between an inner surface of the composite structure and an outer surface of the composite structure. The method includes imaging, using a surface-strain imaging apparatus, an area of an outer surface of the composite structure while a temperature of the composite structure warms to thermal equilibrium with a surrounding environment. Due to the temperature gradient, a defect within the composite structure can create an abnormality on the outer surface of the composite structure. For instance, due to the temperature gradient, a delamination within the composite structure can cause an out-of-plane displacement in the outer surface of the composite structure. Using data received from the surface-strain imaging apparatus, a controller can detect such an out-of-plane displacement of the outer surface caused by the temperature gradient. In addition, the controller can determine that the out-of-plane displacement satisfies a threshold condition, and flag the area of the outer surface for further inspection.

The method can be used to inspect an aircraft skin that is exposed to a temperature fluctuation during the transition from cruising to landing. An aircraft may cruise at an altitude of approximately 10,000 meters for an extended period of time. At this altitude, the average temperature is around −56° C. Therefore, while cruising, the aircraft skin may cool to a thermal equilibrium with a surrounding environment. Upon decent, the temperature in the surrounding environment will increase to a temperature that is greater than the temperature at the cruising altitude. The temperature of the aircraft skin may therefore begin to warm up during decent, with outer layers of the aircraft skin warming up faster than inner layers of the aircraft skin. As a result, upon landing and for a period of time after landing, the aircraft skin will have a naturally occurring temperature gradient between an inner surface of the aircraft skin and an outer surface of the aircraft skin.

Advantageously, the systems and methods described herein can be used to inspect an aircraft skin without requiring extended time out of service. For instance, the systems and methods can be used to inspect an aircraft skin during downtime between flights. Further, the inspection technique is a non-invasive technique that can be carried out without removal of panels or physically contacting the aircraft skin. Hence, the systems and method provide a solution for rapid, in-situ, damage detection of aircraft skins and other composite structures.

Various other features of these systems and methods are described hereinafter with reference to the accompanying figures.

Referring now to FIG. 1, FIG. 1 illustrates a system 100, according to an example. As shown in FIG. 1, system 100 includes a surface-strain imaging apparatus 102, a controller 104, and an output component 106. Controller 104 and/or output component 106 can be coupled to or positioned within surface-strain imaging apparatus 102. Surface-strain imaging apparatus 102, controller 104, and/or output component 106 can also be in wired or wireless communication with each other by way of one or more communication links or in wired or in wired or wireless communication with a central computing device. Further, surface-strain imaging apparatus 102, controller 104, and output component 106 can be components of a common apparatus. The apparatus may be a portable apparatus.

As shown, surface-strain imaging apparatus 102 includes a detector 108. Detector 108 can include a charge-coupled device (CCD) camera, for instance. Surface-strain imaging apparatus 102 is configured to image an area of an outer surface of a composite structure 110 using detector 108. One example of a composite structure is an aerospace composite structure such as an aircraft skin. System 100 can also be used to image other composite structures.

Surface-strain imaging apparatus 102 can take various forms, depending on the desired implementation. As one example, surface-strain imaging apparatus 102 can include a shearography system. As another example, surface-strain imaging apparatus 102 can include a D-Sight system having a light source and a retroreflective screen. As still another example, surface-strain imaging apparatus 102 can include a three-dimensional (3D) scanner.

Surface-strain imaging apparatus 102 can be a handheld measurement instrument. Alternatively, surface-strain imaging apparatus 102 can be attached to a robotic crawler (not shown in FIG. 1) or an unmanned aerial vehicle (UAV) (also not shown in FIG. 1). Further, in some instances, system 100 can include a plurality of surface-strain imaging apparatuses configured to image different respective areas of composite structure 110 from different respective viewpoints.

Controller 104 can take the form of a control unit, laptop computer, mobile computer, wearable computer, tablet computer, desktop computer, or other type of computing device. As such, controller 104 includes a processor 112 and a memory 114. Processor 112 could be any type of processor, such as a microprocessor, digital signal processor, multicore processor, etc. Memory 114 can include a non-transitory computer readable medium storing program instructions that are executable by processor 112 or a group of processors to carry out any of the controller functions described herein. Controller 104 can further include a display, an input device, and one or more communication ports through which controller 104 is configured to communicate with other components of system 100 or other devices that are external to system 100.

Controller 104 can be configured to receive data indicative of a shape of the outer surface of composite structure 110 from surface-strain imaging apparatus 102. The data can include heights of various points of the outer surface within an area imaged by surface-strain imaging apparatus 102. For example, points of the outer surface can be represented using x, y, and z coordinates of a three-dimensional coordinate system. With this approach, the heights can be the z values for the points.

Further, controller 104 can be configured to determine whether the data is indicative of a delamination between internal layers of composite structure 110. For instance, controller 104 can be configured to detect an out-of-plane displacement of the outer surface, and determine whether the out-of-plane displacement satisfies a threshold condition.

Detecting an out-of-plane displacement can involve detecting a displacement with respect to a plane of the outer surface, such as a bulge. For instance, to detect an out-of-plane displacement, controller 104 can identify a point on the surface as being a local maxima in the z dimension, and compare the z value for the maxima with z values of points surrounding the point. This comparison can involve calculating one or more surface gradients for the identified maxima. If one or more of the surface gradients are greater than a threshold, controller 104 can identify the point as being indicative of an out-of-plane displacement. Other techniques for detecting an out-of-plane displacement using the data received from surface-strain imaging apparatus 102 are also possible.

Determining whether the out-of-plane displacement satisfies a threshold condition can involve determining at least one property of the out-of-plane displacement, and comparing the at least one property with a threshold. For instance, determining whether the out-of-plane displacement satisfies the threshold condition can involve determining a height of the out-of-plane displacement, and determining whether the height exceeds a threshold height.

In one example, the height of the out-of-plane displacement can be defined as a distance in the z-dimension between a point representing the out-of-plane displacement and an average z value for all points of the area (or an average z value for a group of points surrounding the point). Further, the threshold height could be a few thousandths of an inch (e.g., six thousandths, ten thousandths, etc.). The threshold could vary depending on the desired configuration of system 100. For instance, an operator could configure the threshold based on an estimate of a range of the temperature gradient within composite structure 110.

As another example, determining whether the out of-plane-condition satisfies the threshold condition can involve determining whether a size (e.g., area) of the out-of-plane displacement satisfies a threshold size. For instance, the threshold size could be a one-inch diameter. An out-of-plane displacement having a diameter that is less than the threshold size might not need to be repaired. Whereas, an out-of-plane displacement having a diameter that exceeds the threshold size might require scheduling of a temporary or permanent repair. Alternatively, the threshold size could be a threshold area, such as five hundred square millimeters.

Upon determining that an out-of-plane displacement satisfies a threshold condition, controller 104 can flag the area of the outer surface for further inspection. Flagging the area of the outer surface for further inspection can involve causing output component 106 to provide a visual indication or an audible indication.

Output component 106 can include a speaker, and the audible indication can be an audible tone or other sound. Additionally or alternatively, output component 106 can include a light source, and the visual indication can include an illumination of the light source. Similarly, output component 106 can include a display, and the visual indication can include a text and/or graphic displayed on the display. An operator of system 100 can interpret a visual indication or an audible indication provided by output component 106 to mean that the data analyzed by controller 104 is indicative of a potential delamination between internal layers of composite structure 110.

In some instances, flagging the area of the outer surface for further inspection can involve highlighting a region corresponding to the area on a diagram of composite structure 110. For example, controller 104 can cause output component 106 to display a diagram of the composite structure, with a region corresponding to the area highlighted by a color difference of the region with respect to other parts of the diagram, a border surrounding the region, an arrow pointing to the region, etc. Additionally or alternatively, controller 104 can send the diagram with the highlighted region to another device. Controller 104 can use a relative position and orientation of surface-strain imaging apparatus 102 with respect to a position of composite structure 110 as a basis for determining the region to highlight. Alternatively, controller 104 can determine the region based on an input received from an operator of system 100. For instance, system 100 can prompt the operator to specify the region upon determining that an out-of-plane displacement satisfies a threshold condition.

Figure 2:
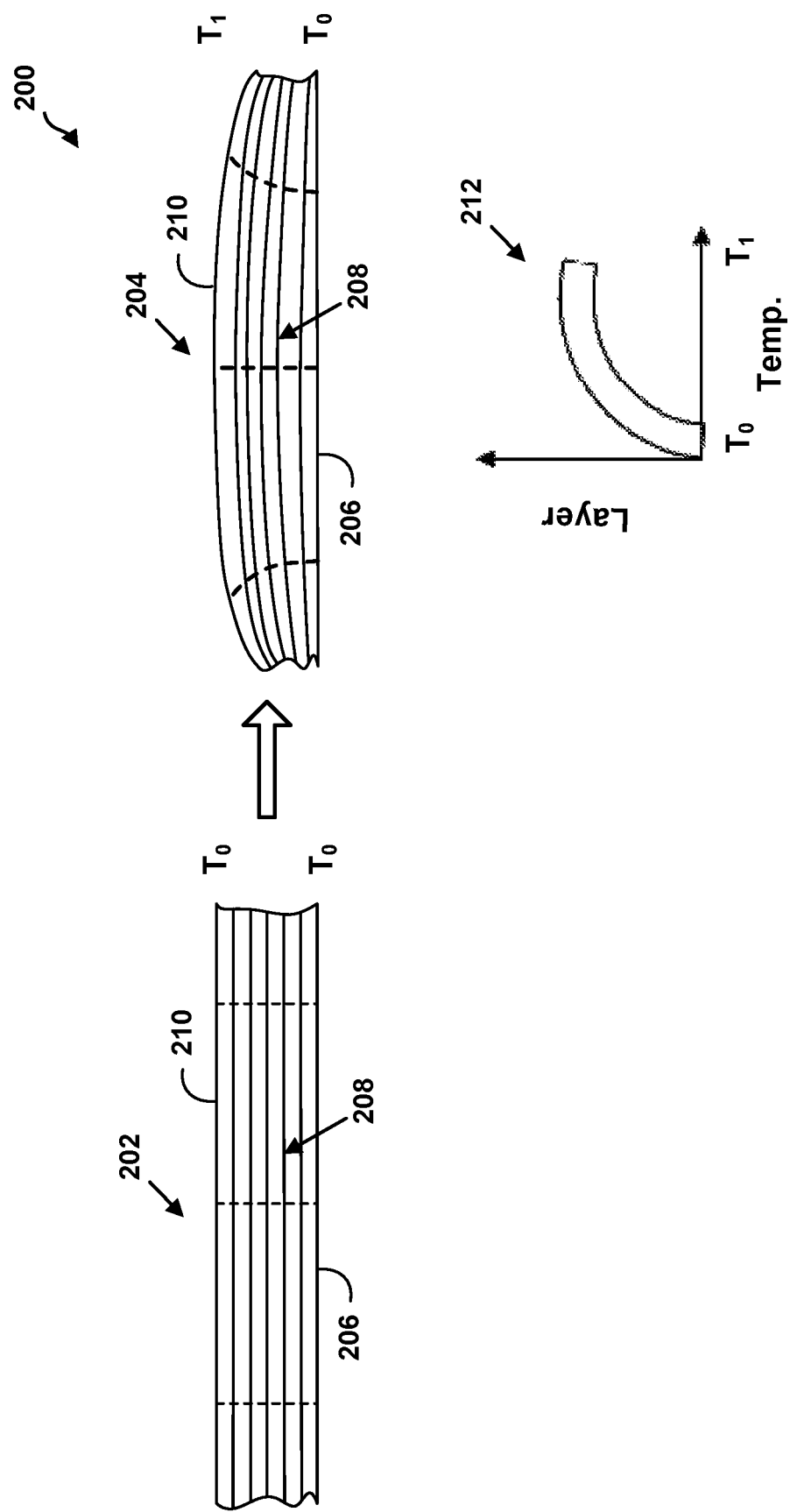
FIG. 2 is a conceptual illustration of the influence of a temperature gradient on an aircraft skin, according to an example.

FIG. 2 is a conceptual illustration 200 of the influence of a temperature gradient on an aircraft skin, according to an example. Conceptual illustration 200 includes a first cross-sectional view 202 of the aircraft skin and a second cross-sectional view 204 of the aircraft skin. As shown in FIG. 2, the aircraft skin includes an innermost layer 206, multiple internal layers 208, and an outermost layer 210.

First cross-sectional view 202 represents an unstressed state of the aircraft skin when temperatures of innermost layer 206 and outermost layer 210 are both approximately equal to a temperature $T_0$. In line with the discussion above, temperature T0 may be a steady state temperature of the aircraft skin at cruising altitude, such as around −55° C. In the unstressed state, the layers of the aircraft skin are relatively parallel.

Second cross-sectional view 204 represents a stressed state of the aircraft skin due to a temperature gradient within the layers of the aircraft skin. Due to the principle of thermal expansion, some materials change in length as the temperature of the material changes. The fraction of change that a material has per degree of change in temperature is referred to as the coefficient of thermal expansion (CTE). For instance, the CTE of carbon fiber at temperatures between 25° C. and 60° C. is $2.42 \times 10^{-6}$ m/(m·° C.) and between −30° C. and 0° C. is $1.73 \times 10^{-6}$ m/(m·° C.).

During descent, the temperature of outermost layer 210 increases as the outside temperature increases. Innermost layer 206 is closest to an interior of the aircraft, and an insulating layer separates the interior of the aircraft and innermost layer 206. As a result, during descent and after landing, internal layers 208 and innermost layer 206 warm up slower than outermost layer 210. Therefore, upon landing, a temperature gradient exists within the aircraft skin.

The temperature gradient is shown in graph 212, which depicts the approximate temperature at each layer. Innermost layer 206 has a temperature of $T_0$ and outermost layer has a temperature of $T_1$, with $T_1$ being greater than $T_0$. Generally, the difference between temperature $T_0$ at innermost layer 206 and temperature $T_1$ at outermost layer may be at least 20° C.

Because of the temperature gradient and the principle of thermal expansion, in the stressed state, the length of outermost layer 210 is longer than the length of internal layers 208, which in turn is longer than the length of innermost layer 206. Due to the differences in lengths, in the stressed state, the aircraft skin has expanded outward from the center, as evident by the curved shape of outermost layer 210.

Figure 3:
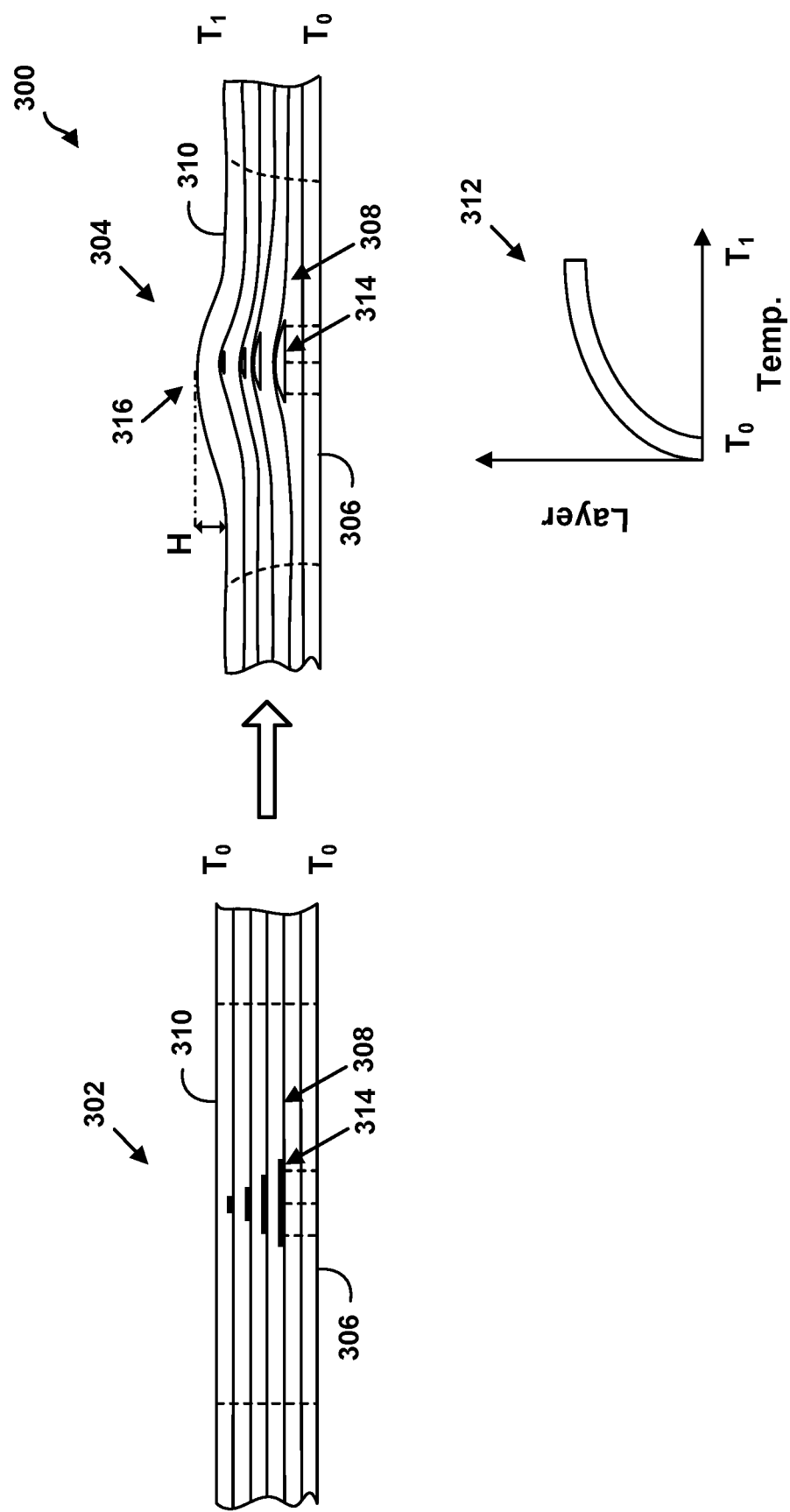
FIG. 3 is another conceptual illustration of the influence of a temperature gradient on an aircraft skin, according to an example.

FIG. 3 is another conceptual illustration 300 of the influence of a temperature gradient on a composite structure, according to an example. Like conceptual illustration 200 of FIG. 2, conceptual illustration 300 includes a first cross-sectional view 302 of the aircraft skin and a second cross-sectional view 304 of the aircraft skin. Further, the aircraft skin includes an innermost layer 306, multiple internal layers 308, and an outermost layer 310. Still further, first cross-sectional view 302 represents an unstressed state of the aircraft skin when temperatures of innermost layer 206 and outermost layer 210 are both approximately equal to a temperature $T_0$. And second cross-sectional view 304 represents a stressed state of the aircraft skin due to a temperature gradient between temperature $T_0$ and temperature $T_1$ within the layers of the aircraft skin. The temperature gradient is shown by graph 312.

However, conceptual illustration 300 differs from conceptual illustration 200 in that the aircraft skin includes several delaminations 314 between layers of the aircraft skin. As shown in second cross-sectional view 304, in the stressed state, the temperature gradient causes an out-of-plane displacement 316 having an out-of-plane displacement height H. Out-of-plane displacement 316 can be detected by imaging outermost layer 310 with a surface-strain imaging apparatus, such as surface-strain imaging apparatus 102 of FIG. 1, and analyzing the resulting image data using a controller.

Out-of-plane displacement 316 is attributable to delaminations 314. For each delamination between a lower layer and an upper layer, the presence of the delamination allows the upper layer to expand upward (i.e., outward from the interior of the aircraft) in the region of the delamination as the upper layer lengthens. Moreover, due to the separation between layers, the rate of heat transfer between an area of the aircraft skin with a delamination is slower than the rate of heat transfer between an area of the aircraft skin that does not have a delamination. In other words, each delamination acts as an insulating layer. Because each delamination acts as an insulating layer, the delaminations allow portions of layers beneath the delaminations (i.e., closer to the interior of the aircraft) to remain colder longer than other portions of the layers that are not insulated by the delaminations.

Figure 4:
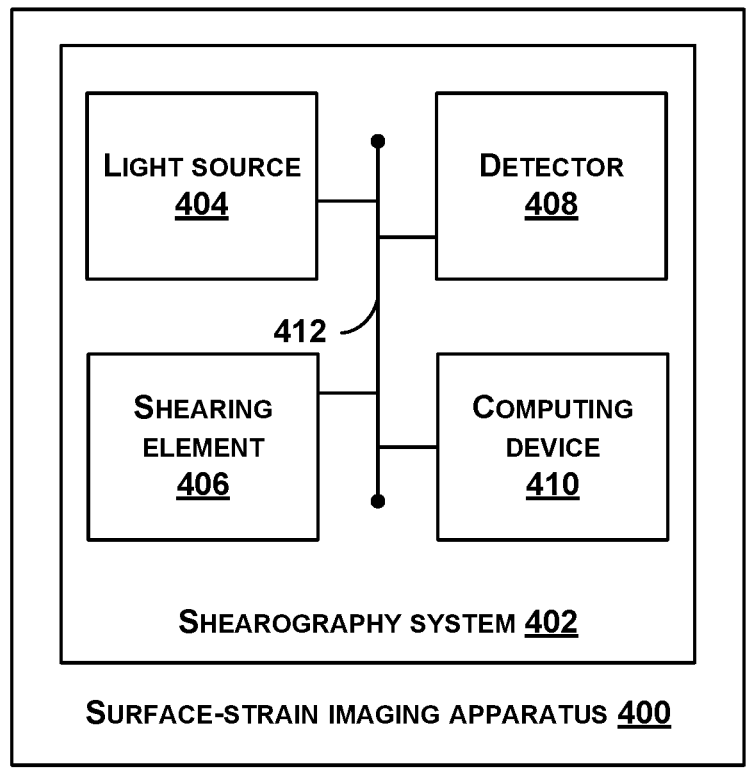
FIG. 4 illustrates a surface-strain imaging apparatus, according to an example.

FIG. 4 illustrates a surface-strain imaging apparatus 400, according to an example. Surface-strain imaging apparatus 400 represents an example configuration of surface-strain imaging apparatus 102 of FIG. 1. As shown in FIG. 4, surface-strain imaging apparatus 400 includes a shearography system 402. Shearography system 402, in turn, includes a light source 404, shearing element 406, detector 408, and computing device 410, all linked together by a system bus, network, or other connection mechanism 412.

In one example, light source 404 can be a laser, shearing element 406 can be a Michelson interferometer, and detector 408 can be a camera. To image an area of an outer surface of a composite structure, computing device 410 can cause light source 404 to illuminate the area while detector 408 images the area through shearing element 406. The use of shearing element 406 allows detector 408 to capture two superimposed images, referred to as a sheared image, representing the outer surface. In operation, shearography system 402 can capture a first sheared image at a first time, and then subsequently (e.g., a few seconds or minutes later), capture a second sheared image. Based on a comparison between the first sheared image and the second sheared image, computing device 410 can determine data indicative of a shape of the outer surface of the composite structure.

One of ordinary skill in the art will appreciate that other shearography systems having other configurations and principles of operation can also be used. For instance, shearography system 402 can further include a load element configured to provide an acoustical or mechanical load to the composite structure. With this configuration, shearography system 402 can obtain a first sheared image corresponding to an unloaded state and a second sheared image corresponding to the loaded state. Computing device 410 can then compare the first sheared image and the second sheared image to determine data indicative of the shape of the outer surface of the composite structure.

Figure 5:
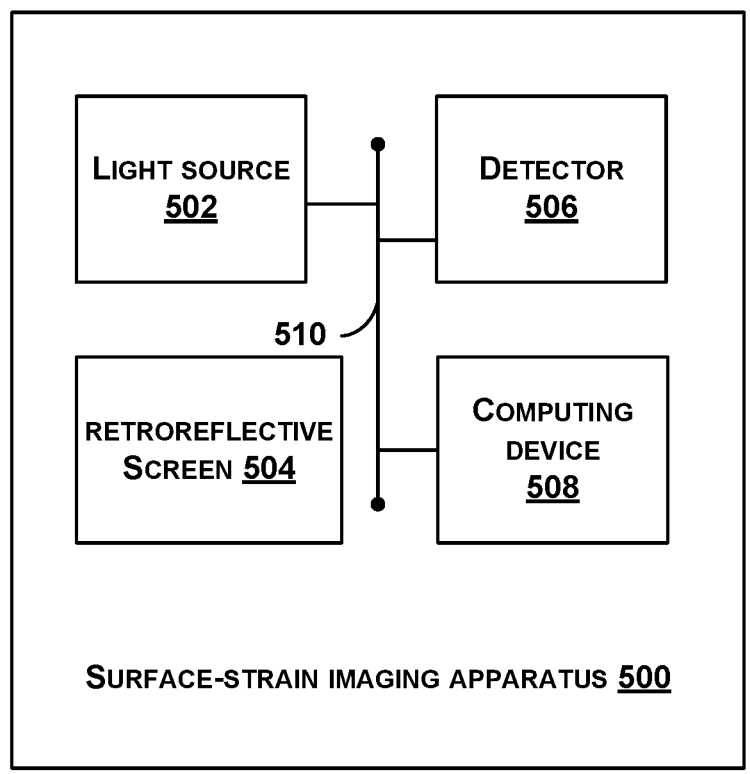
FIG. 5 illustrates another surface-strain imaging apparatus, according to an example.

FIG. 5 illustrates another surface-strain imaging apparatus, according to an example. Surface-strain imaging apparatus 500 represents another example configuration of surface-strain imaging apparatus 102 of FIG. 1. As shown in FIG. 5, surface-strain imaging apparatus 500 includes a light source 502, retroreflective screen 504, detector 506, and computing device 508, all linked together by a system bus, network, or other connection mechanism 510.

Surface-strain imaging apparatus 500 can image an area of an outer surface of a composite structure using an optical double-pass retroflection surface inspection technique. For instance, light source 502 can be a divergent light source, retroreflective screen 504 can include numerous half-silvered glass beads, and detector 506 can be a camera. In operation, computing device 508 can cause light source 502 to illuminate an area of the composite structure. Light from light source 502 is then reflected by the composite structure, and strikes retroreflective screen 504. Retroreflective screen 504 then redirects any incident light back to the composite structure and the light is reflected again by the composite structure and collected by detector 506. If the area of the composite structure is uniformly flat, detector 506 may observe and output data indicative of a uniform light intensity over the surface. However, if an out-of-plane displacement is present on the outer surface of the composite structure, detector 506 will observe local intensity differences over the area. Computing device 508 can analyze the intensity differences, and output data indicative of a shape of the outer surface.

Figure 6:
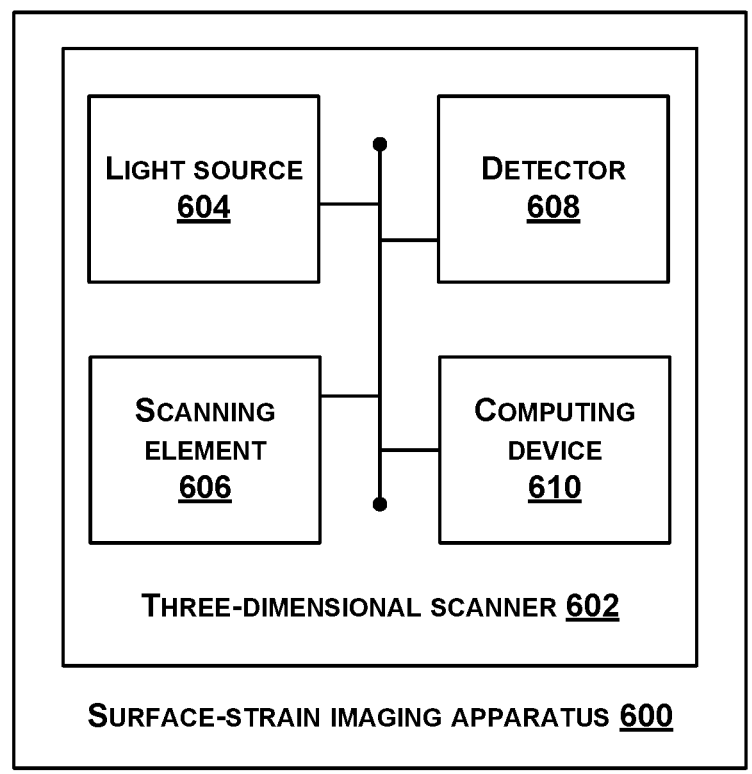
FIG. 6 illustrates another surface-strain imaging apparatus, according to an example.

FIG. 6 illustrates another surface-strain imaging apparatus, according to an example. Surface-strain imaging apparatus 600 represents another example configuration of surface-strain imaging apparatus 102 of FIG. 1. As shown in FIG. 6, surface-strain imaging apparatus 600 includes a 3D scanner 602. 3D scanner 602, in turn, includes a light source 604, scanning element 606, detector 608, and computing device 610.

3D scanner 602 can take various forms. For instance, 3D scanner 602 can be a laser line scanner. With this configuration, light source 604 can be a laser, and scanning element 606 can scan a laser beam output by light source 604 over an area of the outer surface of the composite structure. Further, detector 608 can be a camera that captures an image of the laser beam that appears on the outer surface. By triangulating between the position of the laser, the position of the camera, and the points where the laser beam appears on the outer surface, computing device 610 can determine distances to various points of the outer surface.

As another example, 3D scanner can be a time of flight camera (e.g., LIDAR) that employs time-of-flight techniques to determine distances between detector 608 and various points on the outer surface, by measuring a round-trip time of a laser pulse output by light source 604. As still another example, 3D scanner 602 can be a structured-light 3D scanner. With this approach, light source 604 projects light patterns onto the outer surface of composite structure, which are then detected by detector 608 and analyzed by computing device 610 to determine the shape of the outer surface.

Figure 7:
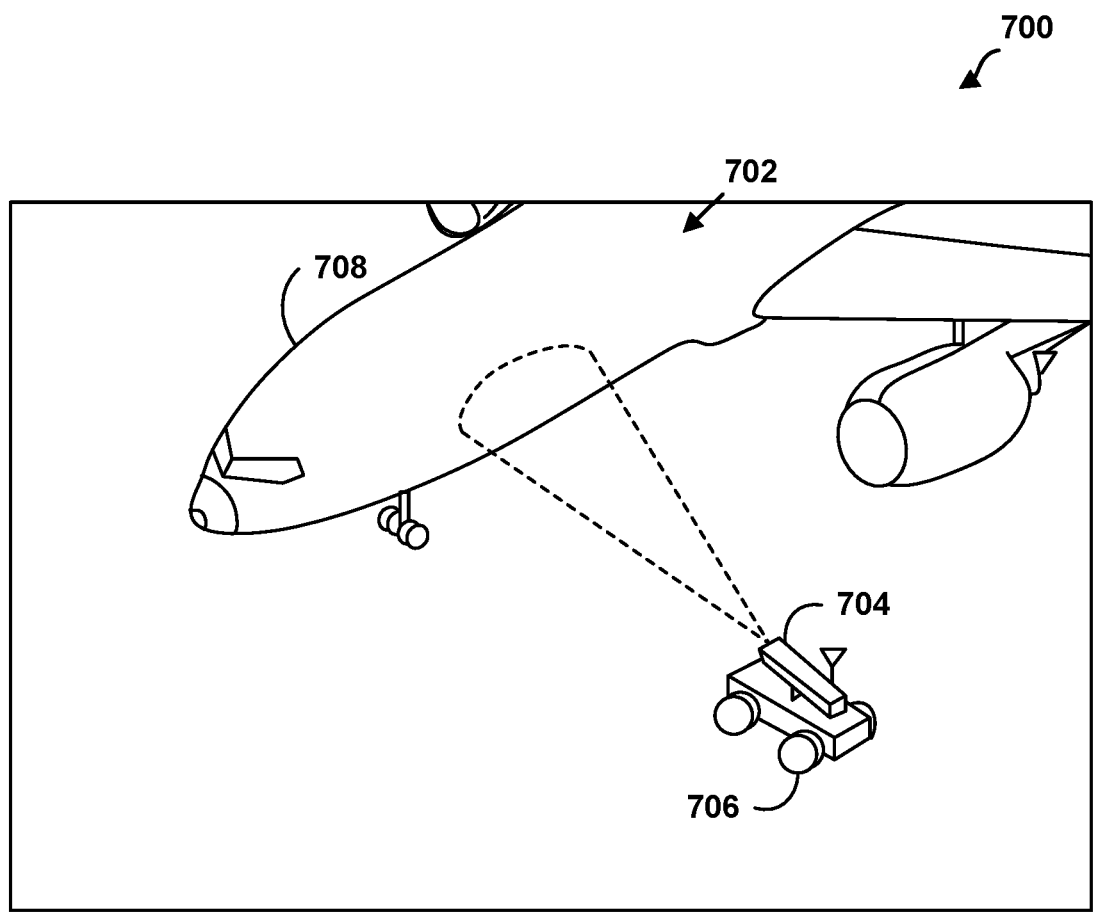
FIG. 7 is a conceptual illustration of an in-situ inspection of an aircraft, according to an example.

FIG. 7 is a conceptual illustration 700 of an in-situ inspection of an aircraft 702, according to an example. As shown in FIG. 7, a surface-strain imaging apparatus 704 is attached to a robotic crawler 706. Robotic crawler 706 can include a locomotive system (e.g., wheels and/or tracks), such that robotic crawler 706 can move surface-strain imaging apparatus 704 to different locations and corresponding viewpoints of an aircraft skin 708 of aircraft 702. In addition, robotic crawler 706 can include one or more actuators that are configured to pan, tilt, and/or rotate surface-strain imaging apparatus 704.

Figure 8:
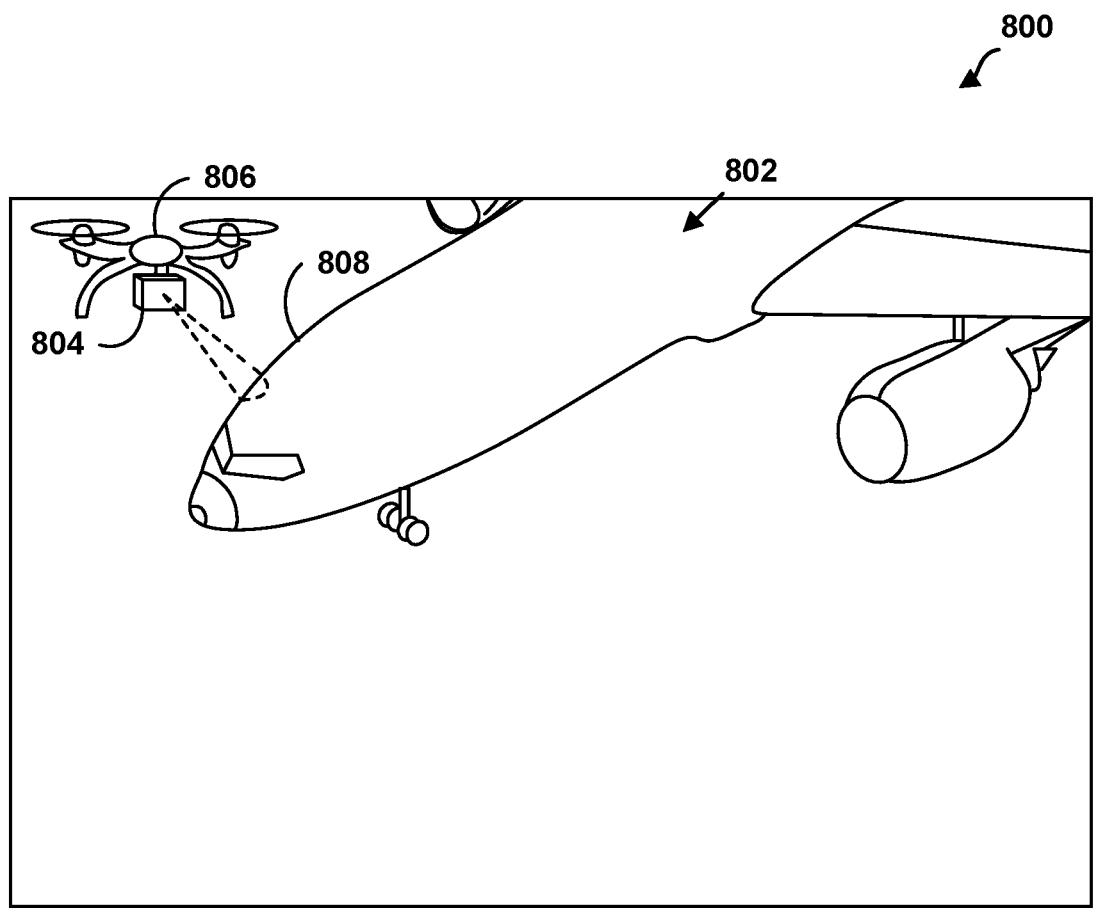
FIG. 8 is another conceptual illustration of an in-situ inspection of an aircraft, according to an example.

FIG. 8 is another conceptual illustration 800 of an in-situ inspection of an aircraft 802, according to an example. As shown in FIG. 8, a surface-strain imaging apparatus 804 is attached to a UAV 806. UAV 806 can include multiple motors and propellers, such that UAV 806 can fly surface-strain imaging apparatus 704 to different locations and corresponding viewpoints of an aircraft skin 808 of aircraft 802. In addition, UAV 806 can include one or more actuators that are configured to pan, tilt, and/or rotate surface-strain imaging apparatus 804.

Figure 9:
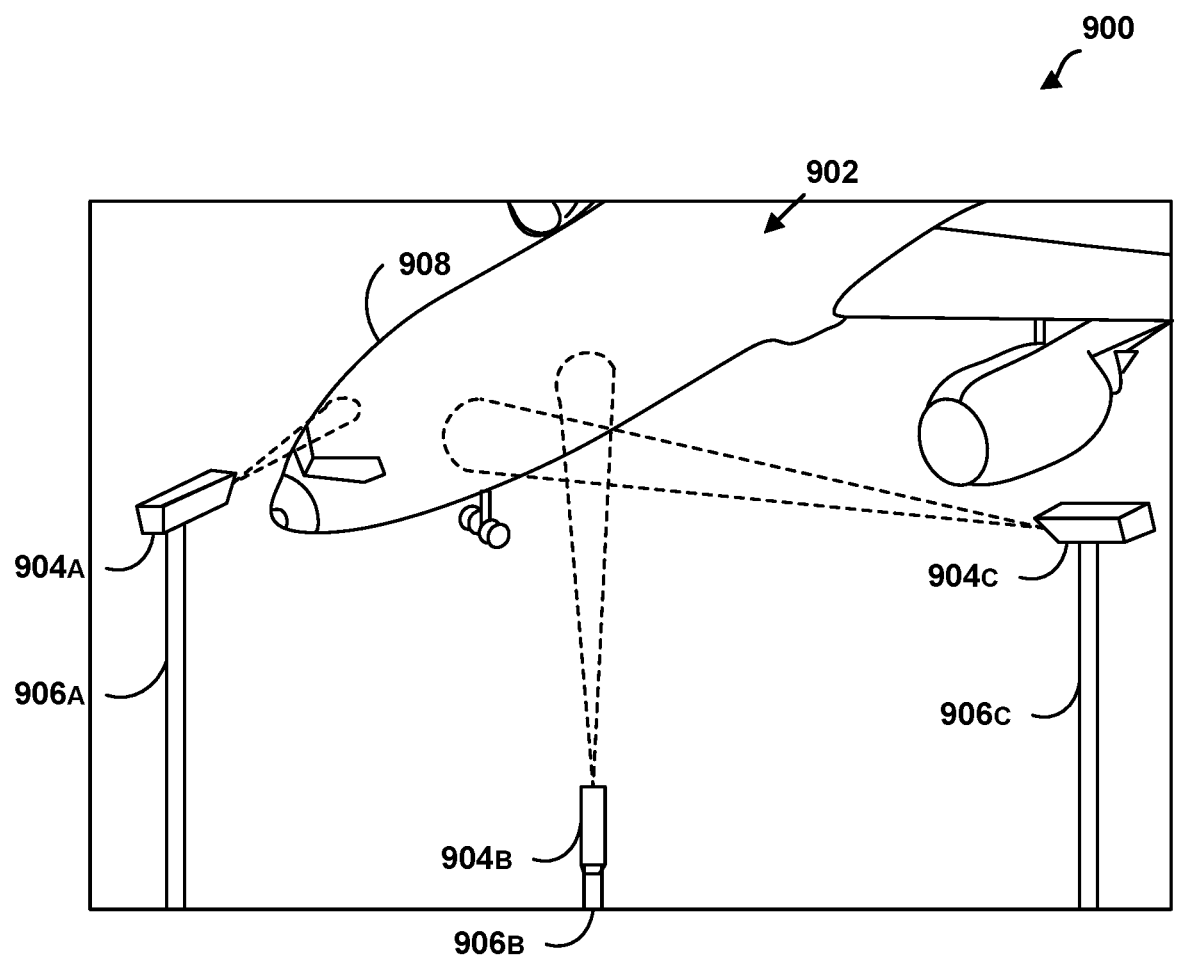
FIG. 9 is another conceptual illustration of an in-situ inspection of an aircraft, according to an example.

FIG. 9 is another conceptual illustration 900 of an in-situ inspection of an aircraft 902, according to an example. As shown in FIG. 9, a first surface-strain imaging apparatus 904*a* is attached to a first support 906*a* and configured to image a first area of an aircraft skin 908 of aircraft 902 from a first viewpoint, a second surface-strain imaging apparatus 904*b* is attached to a second support 906*b* and configured to image a second area of aircraft skin 908 from a second viewpoint, and a third surface-strain imaging apparatus 904*c* is attached to a third support 906*c* and configured to image a third area of aircraft skin 908 from a third viewpoint. Each of first support 906*a*, second support 906*b*, and third support 906*c* can include one or more actuators that are configured to pan, tilt, and/or rotate first surface-strain imaging apparatus 904*a*, second surface-strain imaging apparatus 904*b*, and third surface-strain imaging apparatus 904*c*, respectively. In some examples, first surface-strain imaging apparatus 904*a*, second surface-strain imaging apparatus 904*b*, and third surface-strain imaging apparatus 904*c* can image aircraft skin 908 as aircraft 902 is driven past first support 906*a*, second support 906*b*, and third support 906*c*.

FIG. 10 shows a flowchart of a method 1000, according to an example. Method 1000 shown in FIG. 10 presents an embodiment of a method that, for example, could be used with one of the systems shown in FIGS. 1, 7, 8, and 9, for example, or any of the systems disclosed herein. Any of the example devices or systems described herein, such as components of system 100 of FIG. 1, may be used or configured to perform logical functions presented in FIG. 10.

Method 1000 can include one or more operations, functions, or actions as illustrated by one or more of blocks 1002-1008. Although these blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer readable media that stores data for short periods of time like register memory, processor cache, and RAM. The computer readable media may also be any other volatile or non-volatile storage systems. The computer readable medium may be considered a tangible computer readable storage medium, for example.

Initially, at block 1002, method 1000 includes imaging, using a surface-strain imaging apparatus, an area of an outer surface of a composite structure. The surface-strain imaging apparatus can image the outer surface of the composite structure while a temperature of the composite structure warms to thermal equilibrium with a surrounding environment and a temperature gradient exists between an inner surface of the composite structure and an outer surface of the composite structure. The inner surface of the composite structure and the outer surface of the composite structure are separated by multiple internal layers. For instance, the composite structure can include an aircraft skin having a temperature difference of at least 20° C. between an innermost layer of the aircraft skin and an outermost layer of the aircraft skin. In some examples, the surface-strain imaging apparatus can include a shearography system. In other examples, the surface-strain imaging apparatus can include a 3D scanner.

At block 1004, method 1000 includes detecting, by a controller using data received from the surface-strain imaging apparatus, an out-of-plane displacement of the outer surface in the area caused by the temperature gradient. For instance, the controller can detect an out-of-plane displacement with respect to a plane of the outer surface, such as a bulge. In one example, the received data can be expressed as x, y, z, coordinates within a three-dimensional space for a plurality of points on the outer surface. To detect an out-of-plane displacement, the controller can identify a local maxima in the z dimension, and compare surface gradients for the local maxima to a threshold.

At block 1006, method 1000 includes determining, by the controller, that the out-of-plane displacement satisfies a threshold condition. For instance, controller can determine at least one property of the out-of-plane displacement, and compare the at least one property to a threshold corresponding to the at least one property. The at least one property can include a height of the out-of-plane displacement, a diameter of the out-of-plane displacement, and/or an area of the out-of-plane displacement, for instance.

And at block 1008, method 1000 includes, based on determining that the out-of-plane displacement satisfies the threshold condition, flagging, by the controller, the area of the outer surface for further inspection. Flagging the area of the outer surface can involve causing an output component to output a visual indication and/or an audible indication.

Figure 11:
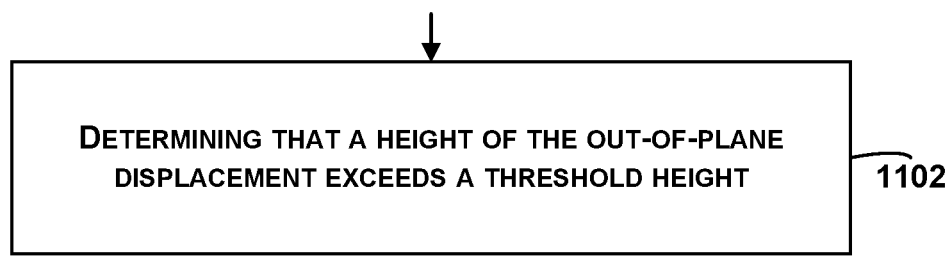
FIG. 11 shows an additional operation for use with the method shown in FIG. 10.

FIG. 11 shows an additional operation for use with the method shown in FIG. 10. Block 1102 of FIG. 11 could be performed as part of block 1006 of FIG. 10. At block 1102, FIG. 11 includes determining that a height of the out-of-plane displacement exceeds a threshold height. For instance, the height of the out-of-plane displacement can be defined as a distance in the z-dimension between a point representing the out-of-plane displacement and an average z value for all points of the area (or an average z value for a group of points surrounding the point). After determining the height, the controller can compare the height to the threshold height.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. A system for in-situ inspection of a composite structure, the system comprising:
   a surface-strain imaging apparatus comprising a detector, the surface-strain imaging apparatus configured to image an area of an outer surface of the composite structure while a temperature of the composite structure warms to thermal equilibrium with a surrounding environment and a temperature gradient exists between an inner surface of the composite structure and the outer surface of the composite structure, wherein the inner surface of the composite structure and the outer surface of the composite structure are separated by multiple internal layers;
   a controller comprising a processor and memory, the controller configured to:
      detect, using data received from the surface-strain imaging apparatus, an out-of-plane displacement of the outer surface in the area caused by the temperature gradient,
      determine that a height of the out-of-plane displacement of the outer surface exceeds a threshold height, and
      based on determining that the height of the out-of-plane displacement exceeds the threshold height, flag the area of the outer surface for further inspection; and
   an output component,
   wherein flagging the area for further inspection comprises causing the output component to output a visual indication.

2. The system of claim 1, wherein flagging the area of the outer surface for further inspection comprises highlighting a region corresponding to the area on a diagram of the composite structure.

3. The system of claim 1, wherein the composite structure comprises an aircraft skin, and wherein the temperature gradient comprises a temperature difference of at least 20 degrees Celsius between an innermost layer of the aircraft skin and an outermost layer of the aircraft skin.

4. The system of claim 1, wherein the surface-strain imaging apparatus comprises a shearography system.

5. The system of claim 1, wherein the surface-strain imaging apparatus further comprises a light source and a retroreflective screen.

6. The system of claim 1, wherein the surface-strain imaging apparatus comprises a three-dimensional (3D) scanner.

7. The system of claim 1, wherein the surface-strain imaging apparatus is a handheld measurement instrument.

8. The system of claim 1, further comprising a robotic crawler, wherein the surface-strain imaging apparatus is attached to the robotic crawler.

9. The system of claim 1, further comprising an unmanned aerial vehicle (UAV), wherein the surface-strain imaging apparatus is attached to the UAV.

10. The system of claim 1, wherein:
    the surface-strain imaging apparatus is configured to image the area of the outer surface from a first viewpoint, and
    the system further comprises another surface-strain imaging apparatus configured to image another area of the outer surface of the composite structure from a second viewpoint that is different from the first viewpoint.

11. A system for in-situ inspection of a composite structure, the system comprising:
    a surface-strain imaging apparatus comprising a detector, the surface-strain imaging apparatus configured to image an area of an outer surface of the composite structure while a temperature of the composite structure warms to thermal equilibrium with a surrounding environment and a temperature gradient exists between an inner surface of the composite structure and the outer surface of the composite structure, wherein the inner surface of the composite structure and the outer surface of the composite structure are separated by multiple internal layers;
    a controller comprising a processor and memory, the controller configured to:
       receive, from the surface-strain imaging apparatus, data indicative of a shape of the outer surface of the composite structure, and
       determine whether the data is indicative of a delamination between internal layers of the multiple internal layers of the composite structure, wherein determining whether the data is indicative of a delamination between internal layers of the composite structure comprises determining whether the data is indicative of an out-of-plane displacement having a height that exceeds a threshold height; and
    an output component configured to provide a visual indication of whether the data is indicative of a delamination between internal layers of the composite structure.

12. The system of claim 11, wherein the composite structure comprises an aircraft skin, and wherein the temperature gradient comprises a temperature difference of at least 20 degrees Celsius between an innermost layer of the aircraft skin and an outermost layer of the aircraft skin.

13. The system of claim 11, wherein the surface-strain imaging apparatus is a handheld measurement instrument.

14. The system of claim 11, wherein:
    the surface-strain imaging apparatus is configured to image the area of the outer surface from a first viewpoint, and
    the system further comprises another surface-strain imaging apparatus configured to image another area of the outer surface of the composite structure from a second viewpoint that is different from the first viewpoint.

15. A method for in-situ inspection of a composite structure, the method comprising:
    imaging, using a surface-strain imaging apparatus, an area of an outer surface of the composite structure while a temperature of the composite structure warms to thermal equilibrium with a surrounding environment and a temperature gradient exists between an inner surface of the composite structure and the outer surface of the composite structure, wherein the inner surface of the composite structure and the outer surface of the composite structure are separated by multiple internal layers;

detecting, by a controller using data received from the surface-strain imaging apparatus, an out-of-plane displacement of the outer surface in the area caused by the temperature gradient;

determining, by the controller, that a height of the out-of-plane displacement exceeds a threshold height; and based on determining that the height of the out-of-plane displacement exceeds the threshold height, flagging, by the controller, the area of the outer surface for further inspection, wherein flagging the area of the outer surface for further inspection comprises causing an output component to output a visual indication.

16. The method of claim 15, wherein flagging the area of the outer surface for further inspection comprises highlighting a region corresponding to the area on a diagram of the composite structure.

17. The method of claim 15, wherein the composite structure comprises an aircraft skin, and wherein the temperature gradient comprises a temperature difference of at least 20 degrees Celsius between an innermost layer of the aircraft skin and an outermost layer of the aircraft skin.

18. The method of claim 15, wherein the surface-strain imaging apparatus comprises a shearography system.

19. The method of claim 15, wherein the surface-strain imaging apparatus further comprises a light source and a retroreflective screen.

20. The method of claim 15, wherein the surface-strain imaging apparatus comprises a three-dimensional (3D) scanner.

* * * * *